UNITED STATES PATENT OFFICE.

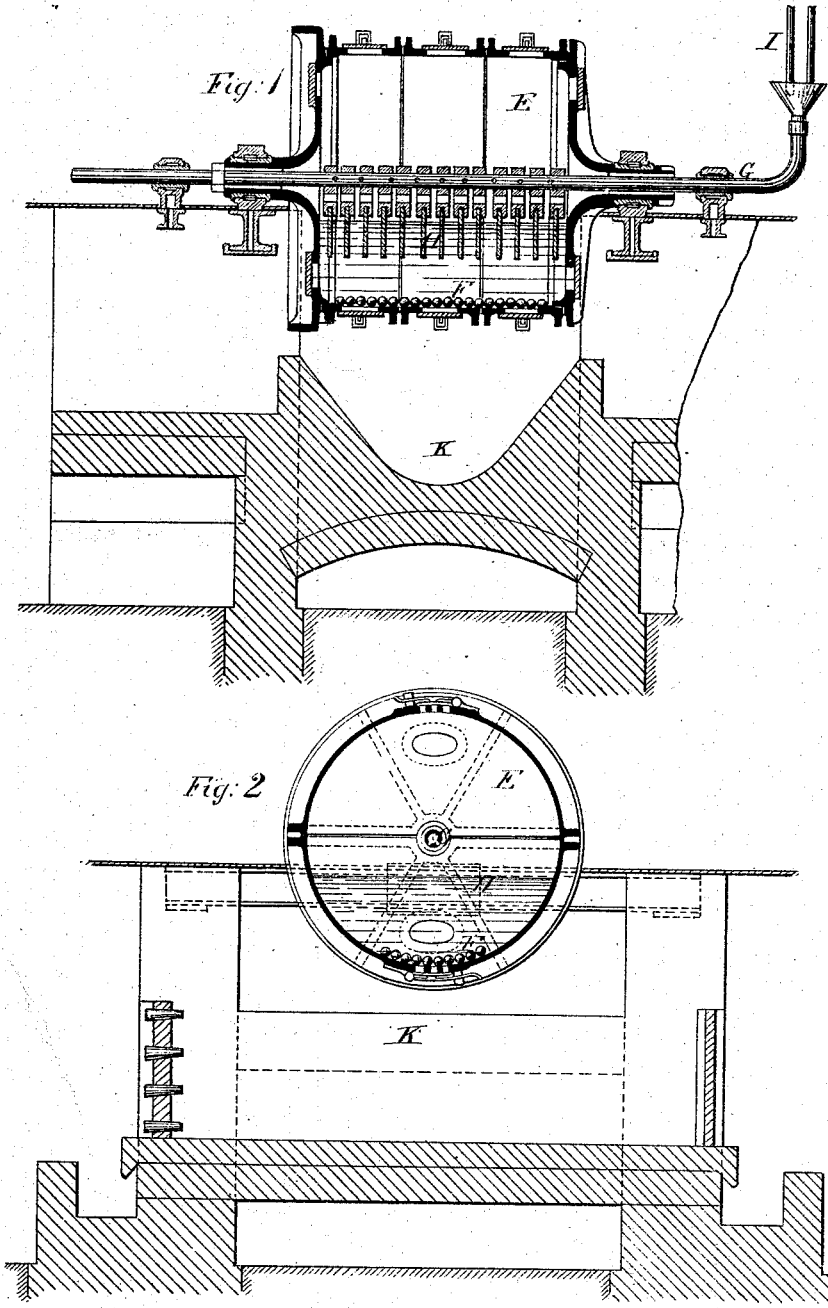

MICHEL BODY, OF LIEGE, BELGIUM.

PROCESS OF AND APPARATUS FOR OBTAINING GOLD AND SILVER FROM THEIR ORES BY COMBINED ELECTROLYTIC AND AMALGAMATING PROCESSES.

SPECIFICATION forming part of Letters Patent No. 291,670, dated January 8, 1884.

Application filed June 26, 1883. (No model.) Patented in England May 10, 1883, No. 2,390, and in Belgium March 31, 1883, No. 60,762.

*To all whom it may concern:*

Be it known that I, MICHEL BODY, a citizen of Belgium, residing at Liege, in the Kingdom of Belgium, have invented a new process of and apparatus for obtaining gold and silver from their ores by combined electrolytic and amalgamating processes, (for which provisional protection has been obtained in Great Britain, dated May 10, 1883, No. 2,390, and patent in Belgium dated March 31, 1883, No. 60,762,) of which the following is a specification.

In the specification to an application for Letters Patent which I have filed, bearing equal date herewith, I have described an improved process for the separation of gold, silver, and other metals from their ores by electrolytic action, wherein the ores are heated with ferric salts in order to render the metals soluble so that they can then be readily removed by combined lixiviation and electrolytic action. According to my present invention, I further combine this process with an amalgamating process while the ore is subjected to the action of the electric current, whereby so perfect a separation of the metal is effected that the process can be used with advantage with ores containing as little as sixteen ounces of silver to the ton. For this purpose I employ, by preference, apparatus arranged and operating as I will now describe with reference to the accompanying drawings. Figure 1 shows a longitudinal section of the apparatus, and Fig. 2 a cross-section of the same. The ore prepared as described in my said other application—that is to say, ground fine, and either treated in heaps with ferric-salt solution, or mixed with ferric salts and roasted—is placed inside a cast-iron drum, E, containing a number of cast-iron balls, F, and which is connected to the negative pole of a dynamo-electric machine and has a slow rotation imparted to it. Through the drum passes a stationary shaft, G, insulated therefrom, and connected to the positive pole of the dynamo-machine. From this shaft are suspended a number of plates, H, of compressed coke or graphite, dipping into a bath consisting of a solution of ferric salts in which the ore is contained. The shaft is made hollow and with perforations, and serves for the introduction of the liquids at I. A steam-supply pipe (not shown) is also made to dip in the bath. The moment the electric current is passed through, the ore, being in contact with the iron, begins to give off its silver, which deposits upon the side of the drum and the surface of the balls, while the ferric salts are converted into ferrous salts. After completion of this first reaction, the requisite quantity of mercury is introduced into the drum, and under the action of the current it takes up the silver, this being facilitated by the partial reduction of the silver. The mercury in the first instance adheres to all the metallic surfaces where the silver is deposited; afterward it agglomerates and separates from the surfaces, thereby showing that all the silver has been taken up. The contents of the drum are then discharged into the tank K below, and the separation of the silver from the amalgam and of the latter from the ore is effected by any of the processes now employed for the purpose.

I am aware that an apparatus for the extraction of metals by combined electrolytic and amalgamating action has been proposed, consisting of a revolving drum forming one electrode of a galvanic battery, and beaters forming the other electrode of the battery, for subjecting the ore to the simultaneous action of a solvent and mercury, as in Patent No. 83,091; also, that an apparatus for simple reduction and amalgamation, without electrolytic action, has been proposed, consisting of a revolving drum, with or without balls, as in Patents No. 9,045 and No. 249,925; and, also, that an apparatus for simple amalgamation with melted lead and electrolytic action has been proposed, consisting of an open pan having two plates serving as electrodes, connected with the poles of a galvanic battery, as in Patent No. 274,083; but my invention differs materially and substantially from these, in that I employ an iron drum connected to one pole of a battery or dynamo, and a central shaft insulated from the drum and connected to the other pole of the battery, and having precipitating-plates suspended therefrom, said shaft being at the same time formed hollow and perforated for the introduction of the solvents.

Having thus described the nature of my invention, and the best means I know for carrying the same into practical effect, I claim—

1. The method of first subjecting gold and silver ores to the action of ferric salts, in combination with the electrolytic process, and the subsequent amalgamation of the metals with mercury under the continued action of the electric current.

2. Apparatus for effecting the separation of gold and silver from their ores, and the amalgamation of the metal with mercury, consisting of the drum E, containing iron balls F, and connected to the negative pole of an electric machine, the hollow perforated shaft G, insulated from the drum and connected to the positive pole of the electric machine, which shaft serves for the introduction of the lye, and has suspended from it the carbon precipitating-plates H, arranged and operating substantially as herein described with reference to the accompanying drawings.

In testimony whereof I have signed my name to this specification, in the presence of two subscribing witnesses, this 8th day of June, A. D. 1883.

M. BODY.

Witnesses:
L. BODSON,
A. HESSELS.